United States Patent [19]
Dayet
[11] 4,246,923
[45] Jan. 27, 1981

[54] SAFETY DEVICE FOR A PNEUMO-HYDRAULIC CONTROL CIRCUIT

[75] Inventor: Jacques Dayet, Lyons, France

[73] Assignee: Societe Anonyme dite: Delle-Alsthom, Villeurbanne, France

[21] Appl. No.: 970,595

[22] Filed: Dec. 18, 1978

[30] Foreign Application Priority Data

Jan. 5, 1978 [FR] France ................ 78 00202

[51] Int. Cl.³ ................ G05D 16/00

[52] U.S. Cl. ................ 137/116; 137/116.3; 137/568

[58] Field of Search ................ 137/116, 116.3, 568; 417/307, 311

[56] References Cited

U.S. PATENT DOCUMENTS 3,720,483 3/1973 Hayner ................ 417/307

FOREIGN PATENT DOCUMENTS 1085114 1/1955 France ................ 137/568
1525813 7/1969 Fed. Rep. of Germany ................ 137/568

*Primary Examiner*—Gerald Goldberg
*Assistant Examiner*—Denis E. Corr
*Attorney, Agent, or Firm*—Sughrue, Rothwell, Mion, Zinn and Macpeak

[57] ABSTRACT

The invention relates to a safety device for protection against the rise of pressure in a pneumo-hydraulic control circuit which includes, upstream, a pressure generator and downstream, a pneumo-hydraulic accumulator. The device is characterized in that it includes, between the generator (3) and the accumulator (1) a non-return valve (6), a first safety valve (4) capable of a discharge at least equal to that of the generator upstream from the non-return valve, a second safety valve (5) downstream from the non-return valve and means for the second safety valve to be subjected to only a small discharge. The invention applies in particular to the pneumo-hydraulic control of very high tension cut-out switches.

2 Claims, 3 Drawing Figures

SAFETY DEVICE FOR A PNEUMO-HYDRAULIC CONTROL CIRCUIT

FIELD OF THE INVENTION

The invention relates to a safety device for a pneumo-hydraulic control circuit such as is used for operating very high tension circuit-breakers.

The hydraulic circuit of such a device must be protected against any danger of a rise in pressure above its maximum design level, by a unit called a safety valve which provides such protection by making the high-pressure hydraulic circuit communicate with a low-pressure fluid tank as soon as the pressure in the circuit exceeds the maximum permissible threshold.

BACKGROUND OF THE INVENTION

Regulations in force in the great majority of countries impose three conditions for the operation of safety valves:

1. The safety valve must begin to open as soon as the pressure of the hydraulic circuit exceeds the rated level; in the case of a pneumo-hydraulic device, this is equivalent to the test value of the hydraulic accumulators.

2. The safety valve must allow the fluid to be removed towards the low-pressure tank following an anomaly constituted by an untimely rise in pressure, e.g. when the motor-driven pump does not stop because of faulty operation of its power supply switch. The pressure in the hydraulic circuit must not exceed the maximum permissible value by 10%.

3. Accidental damage to a component of the safety valve itself should not cause the main valve to be blocked on its seat; consequently the pressure to be controlled must have effect in the direction of the opening of the valve. This excludes the use of a pilot valve.

Experience shows that a valve which fulfills the last condition, i.e. a valve pressed against a seat by a calibrated spring and which is subjected to pressure has, as far as concerns its closing threshold, a response which varies according to the rate of discharge through it; this rate of discharge can range from drop-by-drop in the case of thermal expansion of the fluid, to pump discharge in the case of accidental operation of the motor which drives the pump. The higher the discharge rate, the greater the difference between the opening pressure and the complete closing pressure.

Therefore, in conventional hydraulic assemblies, it is necessary to take this phenomenon into account when fixing the starting threshold of the motor-driven pump. The threshold must be below the lowest closing threshold of the valve; in the contrary case, fluid would be pumped: the valve would never be completely sealed and the motor-driven pump would start up at regular intervals. However, to fulfill such a condition, requires the pump starting threshold and consequently the minimum operation pressure threshold of the installation, to be adjusted well above the maximum permissible rated pressure. This finally results in improper use of the installation from the point of view of energy efficiency.

The present invention aims to provide a device which ensures proper operation of the motor-driven pump while maintaining an operation pressure threshold very close to the maximum permissible rated pressure.

SUMMARY OF THE INVENTION

The invention provides a safety device for protection against the rise of pressure in a pneumo-hydraulic control circuit which includes, upstream, a pressure generator and downstream, a pneumo-hydraulic accumulator, characterized in that it includes, between the generator and the accumulator a non-return valve, a first safety valve capable of a discharge at least equal to that of the generator upstream from the non-return valve, a second safety valve downstream from the non-return valve and means for the second safety valve to be subjected to only a small discharge.

In one embodiment the adjustment threshold of the opening pressure of the first safety valve is lower than the adjustment threshold of the second safety valve.

In another embodiment since the adjustment threshold of the opening pressure of the first safety valve and the adjustment threshold of the second safety valve are identical, the downstream safety valve is provided with means for limiting its discharge rate.

In such an advantageous embodiment the safety valves 4 and 5 are disposed at the ends of a single device and are subjected to the antagonistic action of a common spring interposed between the valves.

BRIEF DESCRIPTION OF THE DRAWINGS

The characteristics and advantages of the device in accordance with the invention will become apparent from the description of embodiments given hereinafter and illustrated in the accompanying drawings, in which.

DETAILED DESCRIPTION

Figure 1:
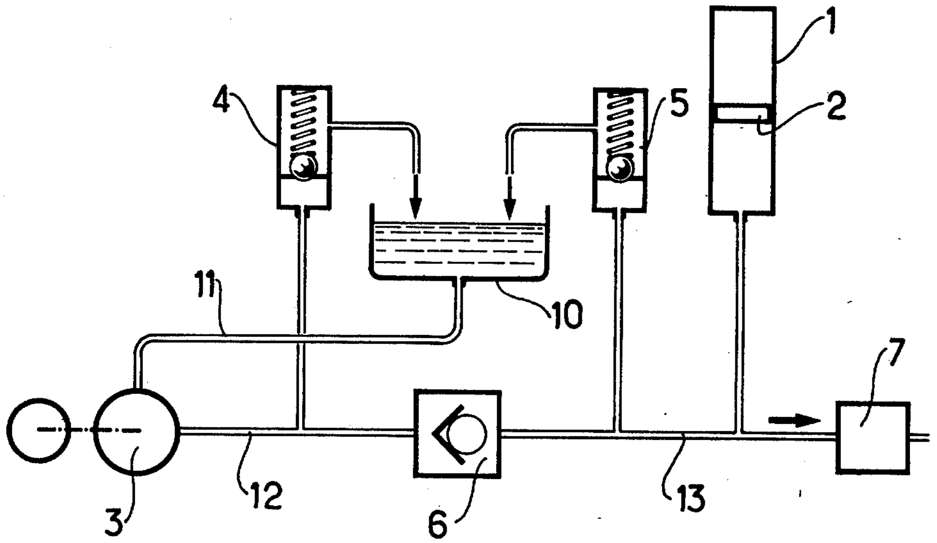
FIG. 1 is the circuit diagram of one embodiment of the invention.

FIG. 1 illustrates a hydraulic installation intended for the pneumo-hydraulic control of a jack, not shown, by means of an electrically operated valve 7.

A pneumo-hydraulic accumulator stores the supplied energy (a compressed gas such air or nitrogen) in a cylinder, by means of a piston 2 driven by a fluid which is not very compressible, e.g. oil. The oil comes from a motor-driven pump unit 3 which draws it at atmospheric pressure from a tank 10 to which it is connected by a pipe 11.

A non-return valve 6 is connected on its upstream side via a pipe 12 to the pump unit 3 and secondly on its downstream side via a pipe 13 to the accumulator 1 and to the electrically operated valve 7.

A first valve 4 is disposed between the upstream pipe 12 and the tank 10, while a second valve 5 is disposed between the upstream pipe 13 and the tank 10.

The maximum discharge rate through the valve 4 is at least equal to that of the pump unit 3. For convenience' sake, the valve 5, which could have a lower maximum discharge rate, is chosen to be identical to the valve 4.

The valve 5 is adjusted so as to open at a pressure P1 whch is higher than the normal maximum pressure, while the valve 4 is adjusted to open at a pressure P2 which is higher than the normal maximum pressure, but is slightly lower than P1. Thus, for example, the valve 5 is adjusted for P1=330 bars while the valve 4 is adjusted for P2=315 bars, in an installation whose normal pressure is 300 bars.

The device operates as follows:

Since the non-return valve 6 is normally closed in the downstream to upstream direction, if the downstream pressure rises slowly for example subsequent to expansion of the oil or even to a rise in pressure in the accumulator tank, the valve 5 opens to allow a drop-by-drop flow and closes again easily at a pressure close to and lower than the pressure P1.

However, if, subsequent to an incident, the pump unit does not stop normally at its rated stoping pressure, the pressure in the pipes reaches P2 and the valve 4 opens to allow the total flow of the pump to pass while the valve 5 remains closed, and opens to allow a drop-by-drop flow only if it is subjected to a pressure P1.

After the pump unit stops, the valve 4, which was wide open closes at a pressure which is very much lower than P2, but this is not a disadvantage, since in all cases, the non-return valve will maintain a downstream pressure at least equal to P2 and the installation can continue to operate, at least during the time in which the accumulator is capable of delivering a satisfactory pressure.

Figure 2:
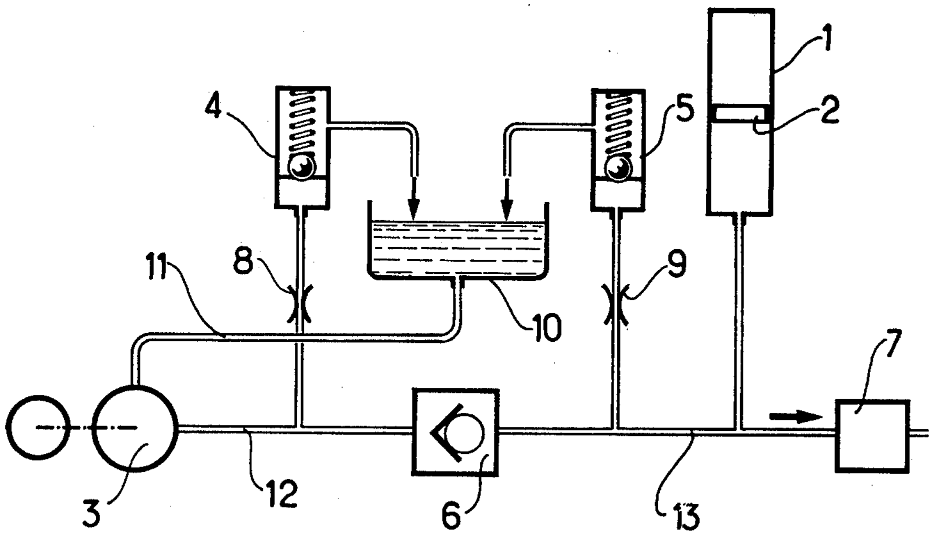
FIG. 2 is the circuit diagram of another embodiment of the invention.

The circuit of the variant illustrated in FIG. 2 is very similar to that illustrated in FIG. 1, but the two valves 4 and 5 are adjusted therein at the same operation threshold P1 which is very close to that of the limit pressure of the installation, while the discharge rate of the valve 5 is limited to a low rate by the presence of a restriction 9. The discharge rate of the valve 4 may be limited to that of the pump unit by another restriction 8.

The operation of the above variant is as follows.

In the case of a slow rise in pressure, the valve 4 and 5 open simultaneously or almost simultaneously and discharge oil into the tank 10 at a very low rate of flow.

In the case of a sudden rise in pressure, the valves 4 and 5 open at the threshold P1, but since the valve 5 has its discharge rate limited by the restriction 9, it opens very little and hence closes at a pressure of about P1. In contrast, the valve 4 through which a high discharge flows closes at a pressure very much lower than P1. But this is not a disadvantage since as in the diagram of FIG. 1, the nonreturn device prevents a corresponding pressure reduction in the portion situated downstream.

Figure 3:
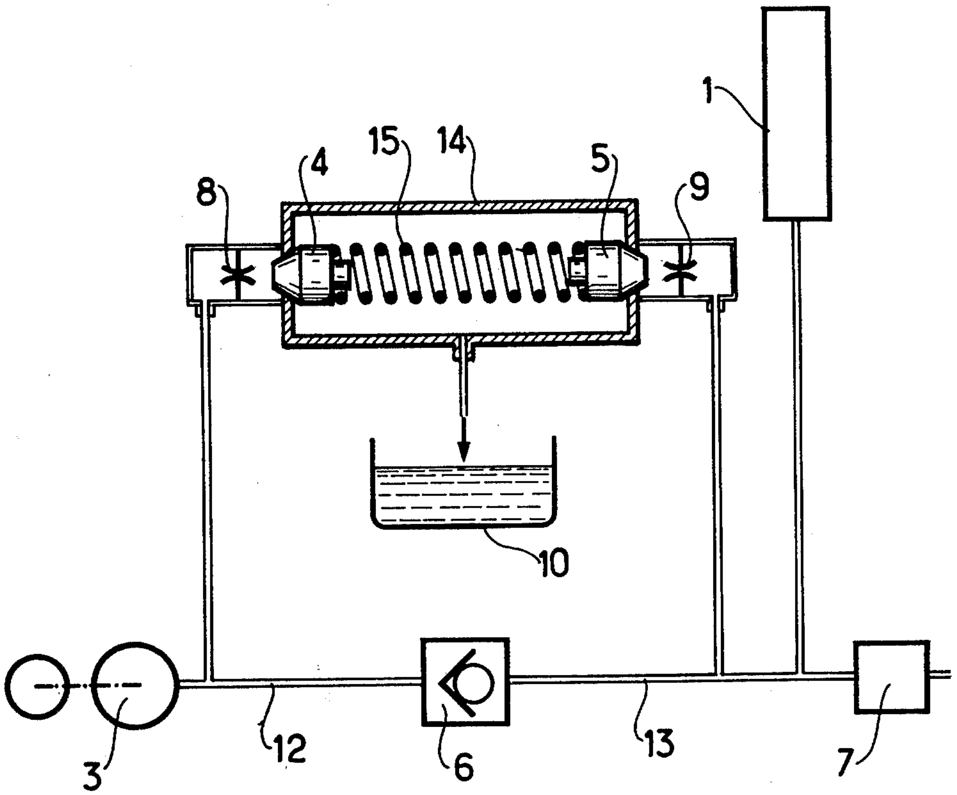
FIG. 3 is the circuit diagram of a variant of the embodiment in FIG. 2.

In a variant of the above embodiment, it is an advantage to group the valves together in the body of a single device 14, as shown in FIG. 3. The valves 4 and 5 are then disposed at the opposite ends of the device, while a single compression spring 15 is interposed between the safety valves; the device then has only one orifice 16 for a return flow to the tank 10.

Such a device, which is extremely simple, has numerous advantages: low cost price, reliability and equality of the operation thresholds due to the common calibrating spring.

it is evident that the invention is in no way limited to the embodiments which have just been described and illustrated and which has been given only by way of example; in particular, without going beyond the scope of the invention, some dispositions can be modified or some means can be replaced by equivalent means, or even some components can be replaced by others which are capable of performing the same technical function or an equivalent technical function.

I claim:

1. A safety device for protection against the rise of pressure in a pneumo-hydraulic control circuit which includes, upstream, a pressure generator and downstream, a pneumo-hydraulic accumulator, the improvement wherein said device includes, between the generator and the accumulator, a non-return valve, a first safety valve capable of a discharge at least equal to that of the generator upstream from the non-return valve, a second safety valve downstream from the non-return valve, means for ensuring that the second safety valve is subjected to only a small discharge, the adjustment threshold of the opening pressure of the first safety valve and the adjustment threshold of the opening pressure of the second safety valve being identical, said downstream second safety valve being provided with means for limiting its discharge rate, and wherein said safety valves are disposed at the ends of a single device and are subjected to antagonistic action of a common spring interposed between said safety valves.

2. A safety device for protection against the rise of pressure in a pneumo-hydraulic control circuit which includes, upstream, a pressure generator and downstream, a pneumo-hydraulic accumulator, the improvement wherein said device includes, between the generator and the accumulator, a non-return valve, a first safety valve capable of a discharge at least equal to that of the generator upstream from the non-return valve, a second valve downstream from the non-return valve, means for ensuring that the secod safety valve is subjected to only a small discharge, the adjustment threshold of the opening pressure of the first safety valve and the adjustment threshold of the opening pressure of the second safety valve being identical, said downstream safety valve being provided with means for limiting its discharge rate, said discharge rate limiting means being constituted by a restriction, and wherein said safety valves are disposed at the ends of a single device and are subjected to the antagonistic action of a common spring interposed between said safety valves.

* * * * *